(No Model.) 2 Sheets—Sheet 1.

C. S. BRADLEY.
ELECTRIC DRILL.

No. 546,002. Patented Sept. 10, 1895.

Attest:
C. W. Benjamin.
H. G. Tuchman

Inventor:
Charles S. Bradley
by Read & Price
his attys.

(No Model.) 2 Sheets—Sheet 2.
C. S. BRADLEY.
ELECTRIC DRILL.
No. 546,002. Patented Sept. 10, 1895.
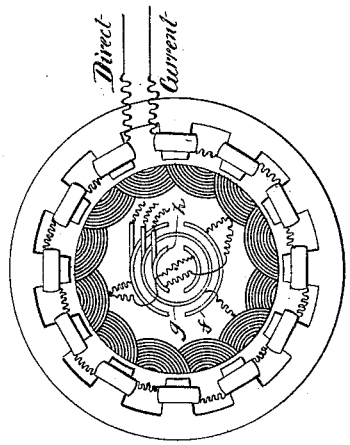
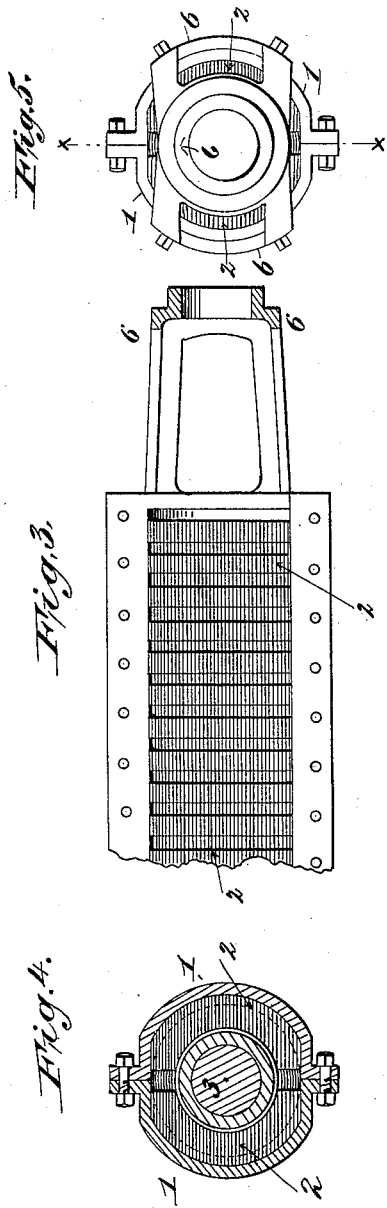
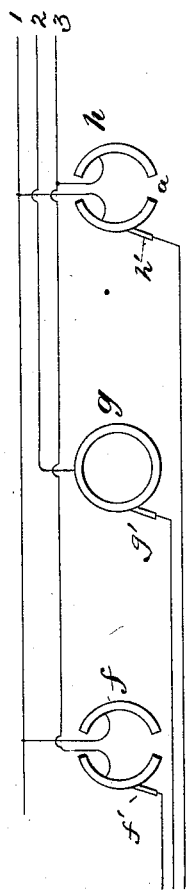

UNITED STATES PATENT OFFICE.

CHARLES S. BRADLEY, OF AVON, NEW YORK.

ELECTRIC DRILL.

SPECIFICATION forming part of Letters Patent No. 546,002, dated September 10, 1895.

Application filed August 20, 1892. Serial No. 443,599. (No model.)

*To all whom it may concern:*

Be it known that I, CHARLES S. BRADLEY, a citizen of the United States, residing at Avon, in the county of Livingston and State of New York, have invented certain new and useful Improvements in Electric Drills; and I do hereby declare the following to be a full, clear, and exact description of the invention, such as will enable others skilled in the art to which it appertains to make and use the same.

This invention relates to electric drills operated by alternating currents, its object being to render the strokes of the drill slow compared to the rate of current alternation. In drills operated by alternating currents as heretofore constructed the drill makes a stroke for each wave of current, requiring a current of slow frequency for its operation. I overcome this difficulty by so constructing the drill that a number of current-waves will be required to produce a complete stroke.

A further object of the invention is to increase the power of the drill by introducing iron into the magnetic circuits.

The several features of novelty will be hereinafter fully described in this specification, and definitely indicated in the appended claims.

Figure 1:
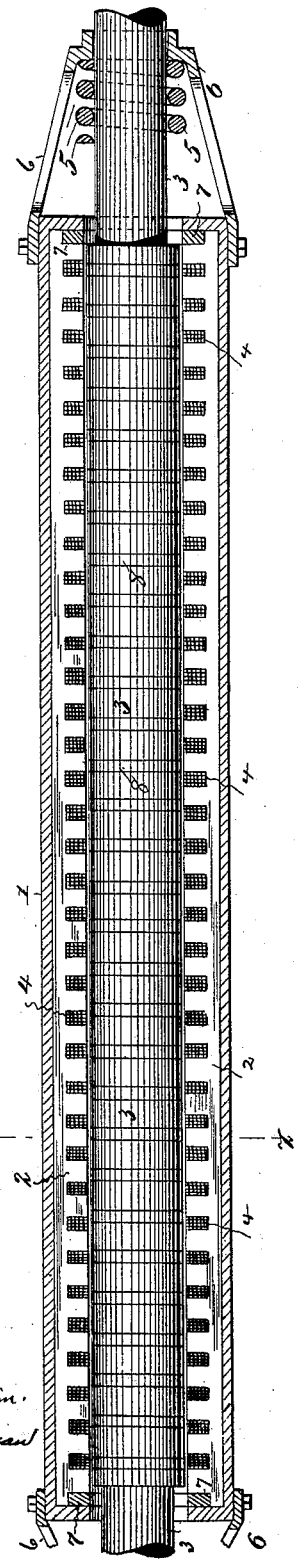
Figure 2:
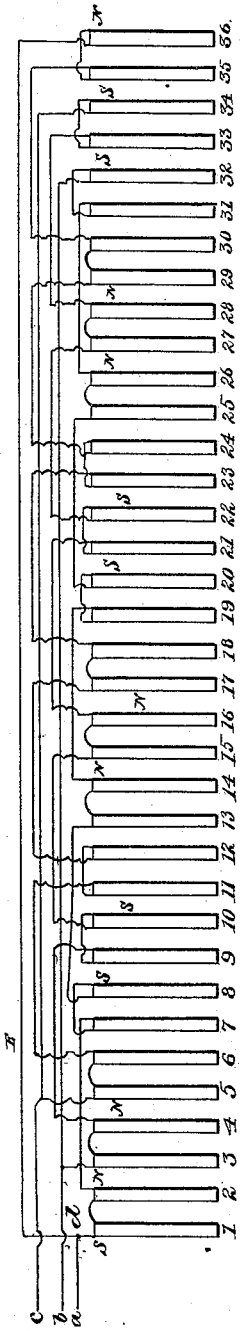

In the accompanying drawings, which illustrate the invention, Figure 1 is a sectional view, partly in elevation, illustrating my invention. Fig. 2 is a diagram showing the circuit connections. Fig. 3 is a detail view on the plane indicated by *x x* of Fig. 5, illustrating part of the shell. Fig. 4 is a sectional view on the line *z z* of Fig. 1. Fig. 5 is an end elevation. Fig. 6 is a diagrammatic view of a generator adapted for use with my drill, and Fig. 7 is a diagrammatic view showing the generator-commutator and its connections.

In carrying out my invention I use differential-phase currents, preferably using a triphase current in which the successive alternations are transmitted from the generator over a three-wire circuit and follow one another at intervals of one-third of a phase or wave length. A series of coils are arranged in line and are so connected that a series of consequent north and south poles will be formed at intervals, which poles, by the mutual action of the polyphase currents, will be given a movement of translation forward and backward along the axis of the coils. Within the coils is placed an iron plunger, with which the drill is connected, and the shifting poles drag the plunger to and fro. The coils are embedded in grooves in a mass of laminated iron, the walls of the grooves approaching as closely as possible to the iron plunger, so as to form a good magnetic circuit. The plunger is preferably provided with a series of circumferential grooves in which are placed coils or bands of copper, forming closed circuits which further increase the power of the drill.

In a metallic shell or casing 1, formed of two sections adapted to be bolted together, as indicated in Figs. 4 and 5, are packed laminated plates 2, the laminations extending longitudinally of the casing. When the parts are assembled, these plates form on the inside a cylindrical recess adapted to contain the drill-plunger. Each plate is provided with a series of grooves or indentations, forming, when all the plates are assembled, circular recesses, in which the several coils 4 of the drill are adapted to rest. After the plates are set in position the coils are set in the grooves of one-half of the shell, the other half is then applied, and the parts are bolted together. The terminals of the several coils may be carried out through channels or grooves across the surface of junction of the two halves, so that the necessary connections may be made to produce the shifting poles. At each end of the drill a suitable cushion, such as a spring 5, is provided, against which a shoulder or projection on the plunger or drill may impinge so as to reduce the shock to the apparatus in case the plunger makes a full stroke. Suitable bearings for the drill are provided, as indicated at 6, to maintain it in center with the coils. The casing containing the laminated plates may with advantage be made of iron. Metallic collars 7, bearing against a flange of the outer casing, may be used to lock the laminated plates in firm contact with the casing and prevent any shifting and possible chafing of the coils. The several coils are connected together so as to develop a number of consequent poles, making the device multipolar in character. As shown in the drawings, there are thirty-six coils, which, being connected as in Fig. 2, develop six consequent poles along the axis of the plunger. Suppose current to be entering in the three-phase circuit by the wire *a* of Fig 2 and returning by wires *b* and *c*. Dividing at the point *d*, one branch will proceed through coils 1 and 2, developing, say, a north pole to the right; will then pass through coils 7 and 8 in a reverse direction, developing a south pole at the point indicated; will then pass through coils 13 and 14 in the same direction, developing poles as indicated, thence through coils 19 and 20, thence to coils 25 and 26, thence to coils 31 and 32, and out by wire *b*. The other branch, starting from the point *d*, will pass by wire E to coils 35 and 36, thence to coils 29 and 30, thence to coils 23 and 24, thence to coils 17 and 18, thence to coils 11 and 12, thence to coils 5 and 6, developing a series of poles displaced longitudinally with reference to the set developed by the other branch. By the co-operation of the two branches consequent poles will be developed at equal intervals along the series of coils, and by the fluctuation of the currents these poles will be shifted longitudinally in orbits whose length is determined by the space occupied by the group of coils developing them. As shown in Fig. 2, this orbit will be limited to the space occupied by six coils—coils 1, 2, 3, 4, 5, and 6, for example—with which the three wires *a b c* connect in groups of two, limiting the extent to which the poles developed by said coils will shift. It will be evident that a greater or less number of coils might be assembled in each group, and consequently the number of poles might be varied. The substantial result of this polar movement is to create a magnetic polar wave along the drill which will gradually shift from one end to the other, completing its transit after a definite number of alternations have occurred. The teeth of the laminated plates and the body of the plunger form an easy magnetic path for the fields of force developed by the several groups of coils. The closed copper rings 8 surrounding the plunger, being cut by the moving fields of force, increase the thrust exerted upon the drill. The rings should be less in number than the coils, or at least should be unsymmetrically arranged with reference to the the coils, so that some of them will always be out of alignment with the poles and thus prevent dead points or sticking.

With the system of connections just described it is evident that the polar wave would travel continuously in one direction, depending on the order of sequence of the alternating currents in the wires *a*, *b*, and *c*, and the drill would be thrust in one direction, but would not automatically return. In order to produce a return motion I commutate the currents so that after a definite number of alternations the order of sequence will be reversed with reference to the supply-wires *a*, *b*, and *c*, and the polar wave will thereby be caused to travel in the reverse direction. This may be accomplished in a two-pole generator by gearing to the axis of the generator a commutator which will reverse the connections periodically; or, if a multipolar-generator be used, by mounting the commutator directly on the shaft and making the number of poles in the generater twice the number of poles developed in the drill. Supposing current to be supplied by a twelve-pole generator, the commutator should in the present case reverse twice for every revolution of the armature of this generator. Supposing the generator to be supplied with a closed-coil armature tapped at three equidistant points, the commutator might be arranged as illustrated in Fig. 7, 1, 2 and 3 representing the connections with the three points of the armature-circuit.

*f*, *g*, and *h* are three commutator-rings, upon which bear the brushes leading to the external circuit. One of these rings is continuous, connecting with point 2, and the other two rings are split, the two halves connecting with the wires 1 and 3, similarly-positioned halves connecting with wires 1 and 3, respectively, and the opposite ones with the wires 3 and 1. Under these circumstances at every half-revolution of the commutator the relationship of the three brushes bearing on the commutator-rings to the points 1, 2, and 3 will change. In the position shown brushes *f'*, *g'*, and *h'* correspond, respectively, to wires 3, 2, and 1. After a half-revolution brushes *f'*, *g'*, and *h'* will correspond to wires 1, 2, and 3. Thus the order of delivery of the alternating currents in the external circuit will be reversed and the direction of movement of the polar wave in the drill will be reversed. During six reversals of current the commutator will remain unchanged, and the polar wave in the drill will move in a uniform direction. The commutator will then change the connections, so that for the next six reversals the polar wave will move in the reverse direction, and thus a reciprocation of the polar wave along the axis of the drill is maintained and the latter is given a vibratory movement, which may be made of any desired rapidity.

While my invention is specially applicable to electric drills, it will also be found useful in other types of reciprocatory motors.

Having thus described my invention, what I claim as new, and desire to secure by Letters Patent, is—

1. The combination with a differential phase alternating current generator adapted to periodically reverse the order of phase delivery, of a reciprocatory motor comprising a series of coils grouped to develop a series of consequent poles and connected with the differential circuits supplied by the generator, whereby a progression of the poles to and fro along the axis of the coils is maintained.

2. The combination of a multipolar differential phase generator of a commutator for changing the order of delivery of the phases at every half revolution of the generator shaft, an electric drill comprising a series of coils grouped to develop a series of consequent poles equal in number to half the number of poles in the generator, and a plunger reciprocated by the shifting of said poles to and fro by the differential phase currents.

3. The combination of a tubular iron frame laminated axially and provided with a series of transverse grooves, a series of coils in said grooves, said coils being connected in closed circuit and tapped at three or more points for connection with a differential phase alternating current circuit, the several coils being grouped to develop a series of consequent magnetic poles along their axis, means at the generator for periodically changing the order of delivery of the alternating currents to the line conductors and an iron plunger actuated by said poles.

4. The combination of a series of coils grouped to develop a series of consequent poles along their axis and connected with a differential phase circuit to produce a progressive movement of the poles, with a plunger surrounded by a series of closed bands or circuits in inductive relation to the coils, said closed bands or circuits being unsymmetrically spaced with reference to the coils.

In testimony whereof I affix my signature in presence of two witnesses.

CHARLES S. BRADLEY.

Witnesses:
C. HENRY AMSDEN,
FRANK B. TAYLOR.